July 13, 1965

W. KUNZE 3,195,102

DEVICE USING THE ECHO SOUNDING METHOD FOR
THE INDICATION OF REFLECTING OBJECTS

Filed Nov. 6, 1961

INVENTOR

Willy Kunze 3,195,102
DEVICE USING THE ECHO SOUNDING METHOD FOR THE INDICATION OF REFLECTING OBJECTS
Willy Kunze, 44 Alten Eichen, Bremen, Germany
Filed Nov. 6, 1961, Ser. No. 151,141
1 Claim. (Cl. 340—3)

This application is a continuation-in-part of Serial No. 358,733, filed June 1, 1953, now abandoned.

This present invention relates, generally, to echo sounding apparatus for measuring distances and jointly therewith, for determining the nature of the reflecting objects from the amplitudes and grouping of the returning echoes and more particularly to a special arrangement of two scales and image areas for the indication of echo signals thereon. Each of these areas serves one of the above-mentioned purposes.

It has long been known to measure distances of reflecting objects by emitting waves and determining the period required for the echoes to return. It has equally been known to draw inferences as to the nature of the reflecting objects from a magnified image of the returning echoes. In particular, fishing vessels have been using both these methods for ascertaining the presence of schools of fish and for determining depth. They use either separate devices for both purposes of apparatus which, though serving both purposes, does not equal the performance of the single purpose type of device in both respects.

The object of my invention is to provide indicating means in a certain geometrical and structural configuration for use in echo sounding apparatus comprising means for displaying a magnified image of an echo signal on a screen having a circular boundary and means for producing echo indications along a circular distance scale within an annular area adjacent to the circumference of the screen, said annular area being either an integrant part of the screen or surrounding it.

Another object of the invention is to provide a circular screen along a diameter of which a luminous spot moves at constant speed and is deflected by the echo signals in a direction perpendicular to the diameter, the motion of the spot across the screen beginning at a time arbitrarily to be chosen in relation to the emission of the signal and equally to provide means in geometrical and structural combination with this device for obtaining accurate depth soundings.

Another object of the invention is to provide indications for measuring distances of reflecting objects along a circular scale adjacent to the circumference of the above-mentioned circular screen thereby enabling to obtain exact readings of the distances concerned on account of the division of a circular scale being more open than that of a rectilinear scale for the same maximum distance to be measured and not exceeding the overall dimensions of the circle and equally to provide means in geometrical and structural combination with this device for obtaining a magnified image of a returning echo on a circular screen.

A further object of the invention is to provide a useful combination of two scales and image areas each of which is best adapted for the special purpose it is to serve, and of means for producing echo indications thereon, to the end of singularly reducing the space heretofore required for such apparatus.

This invention is not concerned with the separate indicating devices and means for producing echo indications thereon mentioned above so far as such means are well-known. Inasmuch as they constitute no part of the present invention, they are not shown in the drawings.

However, such modifications and special devices as are introduced in the apparatus for the purpose of the invention, as described hereafter, are part of the present invention. The various objects and advantages of my invention will be more apparent upon considering the following description of certain embodiments thereof which are illustrated in the accompanying drawings, in which.

Figure 1:
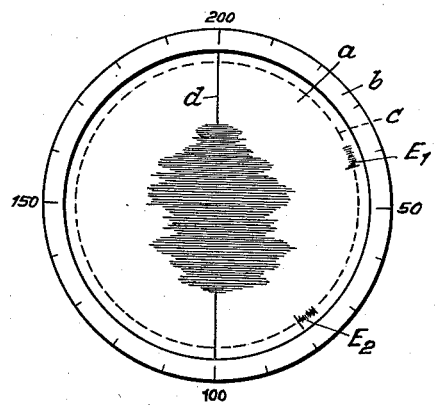
FIG. 1 is a view of the screen of a cathode-ray tube on which is displayed a magnified image of an echo signal simultaneously with depth in directions along a circular scale.

Referring to the diagrammatic view shown in FIG. 1 $a$ is the screen of a double beam cathode-ray tube. One of the beams is rotated by its associated deflection system on a circle $c$ along the edge of a distance scale $b$ surrounding the screen. The rotation of the beam is synchronized with the emission of signals, a short pulse of wave energy being radiated each time when the beam passes past the zero point of the scale. Echo indications, as shown at $E_1$ and $E_2$, may be produced by a radial deflection of the beam and/or by intensity modulation of the beam. The echo indication shown at 36 meters is assumed to originate from a school of fish shown 75 meters from the bottom of the sea. Accurate readings of the depth corresponding to the echo indications may be made on the circular scale, whilst the intensity and particular shape of the echo signal are only indistinctly recognized.

A display of the echo signal permitting of a better observation of these qualities is produced by a second beam moving along a diameter $d$.

The speed of this beam is several times higher than that of the fixed beam. The beginning of its movement does not coincide with the emission of the signal but is variably delayed by well-known means, to the end of making the short time interval during which the beam traverses the diameter coincide with the occurrence of an echo. The echo signal is applied to deflection plates producing a deflection of the beam perpendicular to the diameter it is traversing. A magnified image of the echo signal is then seen on the screen. With a sufficiently rapid displacement of the beam in the vertical direction and a properly chosen amplification of the echo signal every detail of the complex echo signal is clearly seen.

One of the advantages of the invention is that both indications may be seen at a glance. However, this does not preclude using a one-beam cathode-ray tube for both indications, the indication desired at the moment and the corresponding mode of deflection of the beam being chosen by suitable switching arrangements.

Figure 2:
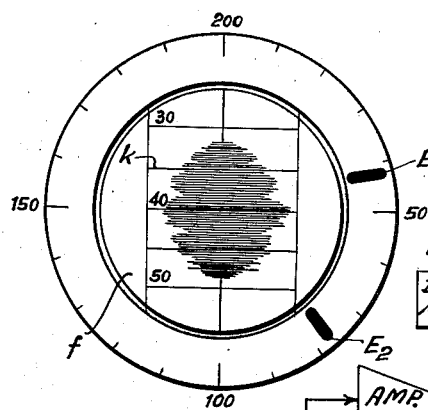
FIG. 2 shows an elevational view of the screen of a cathode-ray tube surrounded by a circular scale with a neon tube as an indicator rotating behind it.
Figure 3:
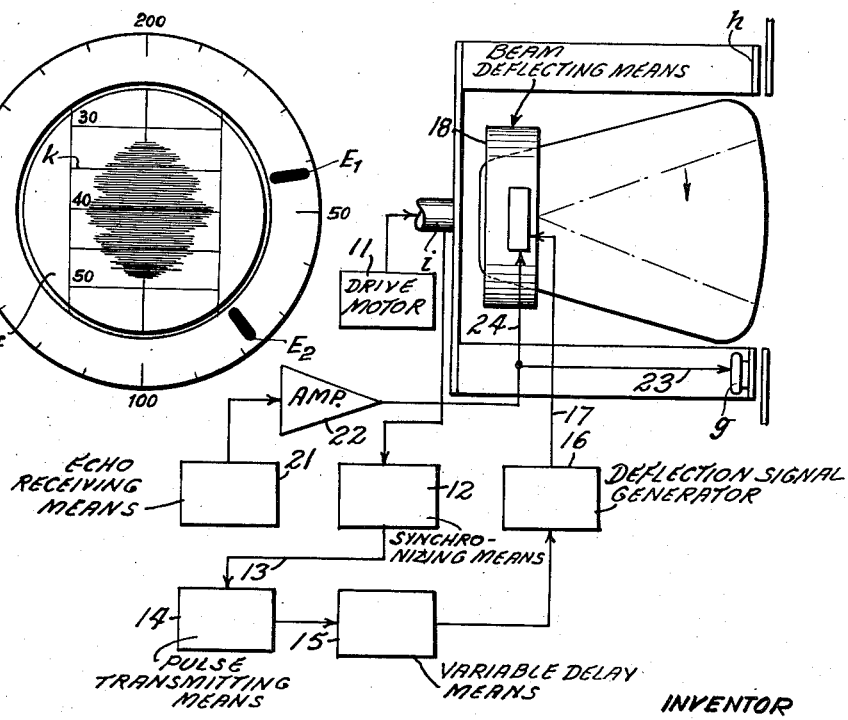
FIG. 3 shows a side elevation of the arrangement shown in FIG. 2 together with a block diagram illustrating the logical arrangement of an exemplary embodiment of a system according to the invention.

FIGS. 2 and 3 show another device constructed in accordance with the present invention wherein different indicating means are structurally combined to the end of providing a configuration of indication areas as described hereinbefore. The magnified image of the echo signal is produced in the same manner as in the embodiment shown in FIG. 1 on the screen of a cathode-ray tube $f$. The echo indications required for determining the distance of reflecting objects are produced by a neon tube $g$, rotated on a circle around the circumference of the screen $f$. The neon tube $g$ is mounted on a ring $h$ which is connected to a shaft $i$ which is driven at constant speed by an electric motor 11. The rotation of the neon tube is synchronized with the emission of signals, so that an emission occurs when the tube passes behind the zero point of the transparent circular scale located in front of the ring $h$. The echo signals received are transmitted to the neon tube after amplification. If sufficient amplification is employed, the weak echo signals from fish are indicated as well as are the stronger signals from the bottom of the sea. Any echo signal appearing on the circular path of the neon tube may be subjected to a closer scrutiny on the screen of the cathode-ray tube, thus enabling the observer to ascertain the nature of the reflecting objects.

In order to indicate the depth corresponding to the time by which the vertical sweep of the beam is delayed relative to the emission of the primary signal and in order to permit a better evaluation of the magnified image of the complex echo signal a numbered scale $k$ is provided on a strip of transparent material arranged in front of the screen, which moves up and down conjointly with the adjustment of the time delay. Suitable markings may also be produced electronically by the traveling beam in the manner well-known from the technique of radar.

With more specific reference to FIG. 3, there is shown a block diagram illustrating the logical arrangement of an exemplary embodiment of a system according to the invention. The shaft $i$ is driven by a drive motor 11. Synchronizing means 12 responds to the angular position of shaft $i$ corresponding to the neon bulb $g$ being oritnted to indicate zero depth by providing an output signal on line 13. The particular form of the synchronizing means 12 is unimportant. For example, it might comprise a cam on the shaft which actuates a switch every time the bulb $g$ is angularly oriented at a point corresponding to zero depth.

In response to each pulse delivered on line 13, pulse transmitting means 14 emits a pulse and simultaneously delivers a pulse to variable delay means 15. The delayed pulse from the latter means is then utilized to trigger a deflection signal generator 16. The deflection signal generator 16 delivers an output pulse, preferably a sawtooth pulse on line 17. This pulse is then applied to the vertical deflecting means of the beam deflecting means 18 to deflect the beam with essentially constant velocity across the vertical center line shown in FIG. 2. The duration of this sawtooth pulse is short compared to the period for one revolution of the neon bulb $g$.

The echo receiving means 21 responds to the echo signal received from objects due to the reflection of the pulse emitted by the pulse transmitting means 14. The output of the echo receiving means 21 is applied to the amplifier 22 and the amplified echo signal coupled by line 23 to the neon bulb $g$ to illuminate the latter. The same amplified signal is coupled by line 24 to the beam deflecting means 18 to deflect the electron beam horizontally so that the wave form of the amplified echo signal is displayed on an expanded depth scale as shown in FIG. 2.

The particular form of the different elements may be any one of numerous well-known types. Thus, the variable delay means 15 and deflection signal generator 16 may be any of the well-known delayed triggered sweeps used on conventional oscilloscopes.

The beam deflecting means may be magnetic or electrostatic. If the beam deflecting means are electrostatic, then the signal on line 17 would be delivered to the vertical plates while the signal on line 24 would be delivered to the horizontal plates.

It is preferred that the variable delay means 15 be variable over a range corresponding to slightly less than the time required for the neon bulb $g$ to make a complete revolution. Thus, if the operator sees the neon bulb flashing at a number of different depths, by adjusting the delay furnished, the wave form of the echo signal returned from one of the indicated depths may be examined on the face of the cathode-ray tube so that the nature of the reflecting object may be determined by interpreting the displayed waveform.

The specific embodiment described herein is by way of example only. It is evident that those skilled in the art may now make numerous modifications of and departures from the specific embodiments described herein without departure from the inventive concepts. Consequently, the invention is to be construed as limited only by the spirit and scope of the appended claim.

What is claimed is:

A method of visually displaying echo signals including the steps of rotating a neon bulb at constant rotational velocity about the periphery of a cathode-ray tube, applying said echo signals to said bulb to provide a visual indication of receipt of said signals, the position of said bulb about the periphery of said tube upon receipt of an echo signal being indicative of the distance to an external object from which that echo signal emanates, and simultaneously displaying the waveform of the latter echo signal upon the face of said cathode ray tube, thereby simultaneously presenting a visual representation of the character of and distance to said object.

References Cited by the Examiner

UNITED STATES PATENTS

| 2,405,239 | 8/46 | Seeley | 343—11 |
| 2,757,354 | 7/56 | Bolzmann | 340—3 |
| 2,767,385 | 10/56 | Smith | 340—3 |
| 2,925,580 | 2/60 | Schumacher | 340—3 |

FOREIGN PATENTS

| 878,617 | 10/53 | Germany. |
| 890,618 | 4/54 | Germany. |
| 938,831 | 2/56 | Germany. |
| 945,820 | 7/56 | Germany. |

CHESTER L. JUSTUS, *Primary Examiner.*